(12) United States Patent
Chu et al.

(10) Patent No.: US 6,306,323 B1
(45) Date of Patent: *Oct. 23, 2001

(54) EXTRUSION OF POLYMERS

(75) Inventors: Edward F. Chu, Sunnyvale; Susan M. Jordan, Mountain View; John Lahlouh, San Jose, all of CA (US)

(73) Assignee: Tyco Electronics Corporation, Middletown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,757

(22) Filed: Jul. 14, 1997

(51) Int. Cl.[7] ................................. B29C 47/72
(52) U.S. Cl. .................. 264/105; 264/210.2; 264/40.7; 425/145; 425/149
(58) Field of Search ................. 264/105, 37.32, 264/176.1, 40.3, 40.7, 177.17, 210.2; 425/145, 147, 149, 325

(56) References Cited

U.S. PATENT DOCUMENTS

| | | | |
|---|---|---|---|
| 3,078,513 | 2/1963 | Levison et al. | 18/12 |
| 4,013,745 | * 3/1977 | Brinkmann et al. | 264/37 |
| 4,171,193 | * 10/1979 | Rahlfs | 425/71 |
| 4,213,747 | 7/1980 | Friedrich | 425/144 |
| 4,237,441 | 12/1980 | van Konynenburg et al. | 338/22 |
| 4,388,607 | 6/1983 | Toy et al. | 338/22 |
| 4,534,889 | 8/1985 | van Konynenburg et al. | 252/511 |
| 4,545,926 | 10/1995 | Fouts, Jr. et al. | 252/511 |
| 4,560,498 | 12/1985 | Horsma et al. | 252/511 |
| 4,591,700 | 5/1986 | Sopory | 219/505 |
| 4,721,589 | * 1/1988 | Harris | 264/40.1 |
| 4,724,417 | 2/1988 | Au et al. | 338/22 |
| 4,774,024 | 9/1988 | Deep et al. | 252/511 |
| 4,858,139 | * 8/1989 | Wirtz | 364/473 |
| 4,885,457 | 12/1989 | Au | 219/548 |
| 4,935,156 | 6/1990 | van Konynenburg et al. | 219/553 |
| 5,049,850 | 9/1991 | Evans et al. | 338/22 |
| 5,167,894 | * 12/1992 | Baumgarten | 264/175 |
| 5,179,521 | * 1/1993 | Edge | 364/473 |
| 5,250,228 | 10/1993 | Baigrie et al. | 252/511 |
| 5,267,847 | * 12/1993 | Bohm et al. | 425/145 |
| 5,378,407 | 1/1995 | Chandler et al. | 252/513 |
| 5,378,415 | * 1/1995 | Gohlisch et al. | 264/40.1 |
| 5,451,919 | 9/1995 | Chu et al. | 338/22 |
| 5,582,770 | 12/1996 | Chu et al. | 252/511 |
| 5,747,147 | 5/1998 | Wartenberg et al. | 428/209 |
| 5,801,612 | 9/1998 | Chandler et al. | 338/22 |
| 5,802,709 | 9/1998 | Hogge et al. | 29/827 |
| 5,814,264 | 9/1998 | Cai et al. | 264/408 |

FOREIGN PATENT DOCUMENTS

WO 98/05503   2/1998   (WO) .

OTHER PUBLICATIONS

Patent Abstracts of Japan, vol. 13, No. 189 (abstract of Japanese PublicationNo. 01016422).

* cited by examiner

Primary Examiner—Jan H. Silbaugh
Assistant Examiner—Mark Eashoo

(57) ABSTRACT

Processes and apparatus for melt extrusion of polymeric compositions, particularly conductive polymers, in which a gear pump delivers molten polymeric composition to an extrusion orifice. Overfeeding of the composition due to pressure variations is avoided by means of a polymer relief means, preferably a second, smaller gear pump, which removes a portion of the molten composition when the pressure exceeds a selected level.

7 Claims, 1 Drawing Sheet

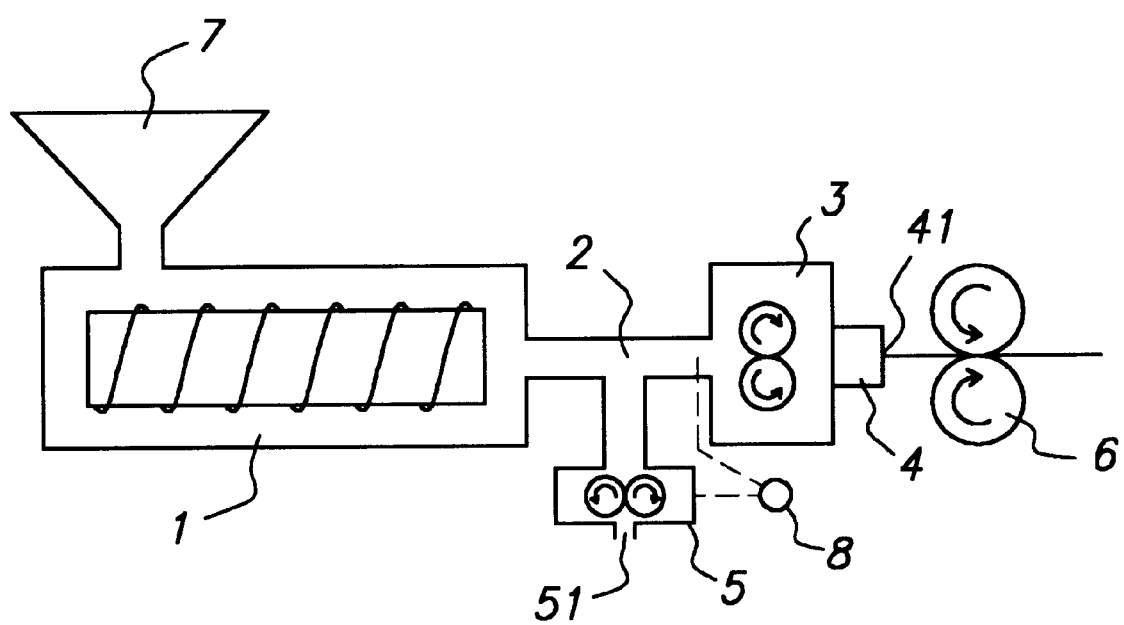

EXTRUSION OF POLYMERS

BACKGROUND OF THE INVENTION

1. Field of the Invention

This invention relates to apparatus and methods for extruding polymer compositions.

2. Introduction to the Invention

Polymeric compositions are often shaped by melt extrusion. A conveying means conveys the molten polymeric composition as a continuous stream under pressure to an extrusion orifice, and forces it through the orifice to form an extrudate of desired shape. In many cases, the composition is fed as a solid to a conveying means which melts the composition through a combination of shearing and external heating. Well known conveying means include single screw and twin screw extruders. Unfortunately, conventional conveying means often fail to deliver the molten composition to the extrusion orifice at a constant rate, as a result of pressure variations within the conveying means, particularly when the composition has high viscosity. This results in an extrudate of variable quality. It is well known to mitigate this problem by placing a gear pump (alternatively known as a melt pump) between the conveying means and the extrusion orifice. The gear pump helps to deliver a substantially constant volume of molten polymeric composition to the extrusion orifice, and in consequence to produce an extrudate of improved quality. However, the gear pump must be correctly sized and the pressure variations must be small enough to ensure that the gear pump is neither starved nor overfed.

SUMMARY OF THE INVENTION

We have found that the problems outlined above are particularly serious when conductive polymers are melt extruded. The term "conductive polymer" is used herein to denote a composition which comprises a polymeric component and, dispersed therein, a particulate conductive filler, e.g. carbon black, graphite, a metal, a conductive ceramic, or a metal carbide or nitride. Particularly when the conductive polymer contains a high concentration of particulate filler (which may be only the conductive filler or a mixture of conductive and non-conductive fillers), pressure variation s during the extrusion process can cause undesirable variation in the electrical properties of the extrudate, even when a gear pump is placed between the conveying means and the extrusion orifice.

We have discovered, in accordance with the present invention, that when a gear pump is used in combination with a conveying means and an extrusion orifice (as outlined above) greatly improved results can be obtained through the use of a polymer relief means, which, when the pressure in the gear pump exceeds a selected level, bleeds molten polymer from the system, and thus ensures that the gear pump is not overfed (and, therefore, continues to deliver a constant volume of molten polymeric composition to the extrusion orifice).

The present invention is particularly suitable for use in the extrusion of conductive polymer and will be chiefly described by reference to such use. However, it is to be understood that the invention can also be used in the extrusion of other polymeric compositions, and that the information given herein for conductive polymers is applicable to other polymeric compositions (with, if appropriate, modifications which will be apparent to those skilled in the extrusion of polymers having regard to their own knowledge and the information herein).

In one preferred aspect, the present invention provides an apparatus for producing a melt-extruded article composed of a polymeric composition, preferably a conductive polymer, the apparatus comprising (1) conveying means for conveying a molten polymeric composition under pressure;

(2) a passageway;

(3) a first gear pump;

(4) an extrusion orifice; and (5) a polymer relief means the components (1), (2), (3) and (4) being arranged so that molten polymeric composition conveyed by the conveying means passes in a continuous stream sequentially through the conveying means, the passageway, the first gear pump and the extrusion orifice; and the polymer relief means being associated with the first gear pump so that, if the pressure in the first gear pump exceeds a first selected level, the polymer relief means removes molten polymeric composition from the continuous stream thereof until the pressure in the first gear pump falls below a second selected level. The second selected level is equal to or lower than the first selected level, and is sufficiently high to ensure that the removal of the molten polymeric composition does not reduce the pressure to a level which results in the melt pump being starved.

As discussed below, the polymer relief means is preferably a gear pump, and for this reason the gear pump (3) is often referred to herein as the "first" gear pump, even though it is the only gear pump when the polymer relief means is a component other than a gear pump.

In a second preferred aspect, the present invention provides a method of making an article composed of a molten polymeric composition, preferably a conductive polymer, the method comprising the steps of (A) conveying a continuous stream of a molten polymeric composition under pressure to a gear pump;

(B) operating the gear pump so that the molten polymeric composition conveyed to the gear pump in step (A) passes through the gear pump to an extrusion orifice and is extruded through the orifice; and (C) when the pressure within the gear pump exceeds a selected level, removing molten polymeric composition from the continuous stream thereof

BRIEF DESCRIPTION OF THE DRAWINGS

The invention is illustrated in the accompanying drawing in which the FIGURE is a diagrammatic view of the apparatus of the invention.

DETAILED DESCRIPTION OF THE INVENTION

This invention is particularly useful when (a) the molten polymeric composition is of high viscosity (since this tends to increase the pressure variations in the extruder or other conveying means); and/or (b) the product is adversely affected by pressure variations during the extrusion process, e.g. if it has at least one dimension which is very small, or if it has electrical or other properties which are dependent on the shear which has been exerted on the composition during extrusion; and/or (c) the extruder (or other conveying means) is of a type which inherently tends to produce pressure variations. Thus, preferred processes of the invention have one or more of the following features.

(a) The polymeric composition
   (i) comprises a polymer having a melting point $T_m$ ° C.;
   (ii) has a viscosity of 2 to 15 K.Pa.sec., particularly 8 to 11 K.Pa.sec., at a shear rate of 50 sec$^{-1}$ at a temperature of 1.5 times $T_m$; and
   (iii) is extruded at a temperature of not more than 1.5 times $T_m$.

Such a composition can contain, for example, at least 35% by volume of one or more particulate fillers, preferably at least 40% by volume of a conductive filler, e.g. carbon black.

(b)(i) The polymeric composition is a conductive polymer exhibiting PTC behavior, particularly such a composition having a resistivity less than 10 ohm-cm, particularly less than 1 ohm-cm.

(b)(ii) The polymeric composition is extruded as a sheet having a thickness less than 0.010 inch (0.25 mm), e.g. 0.005 inch (0.13 mm) or less; or is extruded as a strand or sheet which has a thickness greater than 0.010 inch (0.25 mm) and is then calendered to a sheet having a thickness less than 0.010 inch (0.25 mm), e.g. 0.005 inch (0.13 mm).

(c) The polymer conveying means is (i) a reciprocating single screw extruder, or (ii) a non-reciprocating screw extruder having a relatively short length to diameter (l/d) ratio, e.g. less than 15:1, for example 8:1 to15:1.

As noted above, the polymer relief means is preferably a second gear pump, but it can be any component which will permit the polymeric composition to escape from the system when the pressure becomes excessive and will prevent it from doing so when the pressure has dropped to the desired level. Suitable components include gear pumps, pressure relief valves, and suitable reclosable orifices. When, as is preferred, a second gear pump is used as the polymer relief means, it can be substantially smaller than the first gear pump. Thus, it is preferred that the ratio of the maximum capacity of the first gear pump to the maximum capacity of the second gear pump is 5:1 to 50:1, e.g. 15:1 to 25:1. Preferably, the operation of the second gear pump (or other polymer relief means) is controlled by a control system which continuously monitors the pressure exerted on the polymeric composition and operates the second gear pump in response to that pressure. The control system can monitor the pressure in the first gear pump directly or it can monitor pressure at some other part of the system where the pressure is representative of the pressure in the first gear pump, e.g. in the passageway between the conveying means and the first gear pump.

In order for the first gear pump to deliver a constant volume of molten polymeric composition to the extrusion orifice, the pressure within the gear pump should be between a lower value, $P_{lower}$ and an upper value, $P_{upper}$. The first selected level, $P_1$ (above which the polymer relief means removes molten polymer), should be less than $P_{upper}$, preferably 0.25 to 0.9 times $P_{upper}$. The second selected level, $P_2$ (below which the polymer relief means does not remove molten polymer) is (a) equal to or less than $P_1$, preferably from 0.4 to 1.0 times $P_1$, and (b) greater than $P_{lower}$, preferably 1.2 to 1.6 times $P_{lower}$. One of the advantages of the present invention is that because the polymer relief means ensures that pressure peaks in the extruder are not transmitted to the extrusion orifice, it is possible to operate at higher rates of extrusion than would be possible if the pressure peaks had to be below $P_{upper}$ for the first gear pump.

This invention is particularly suitable for melt extruding conductive polymers of the kind used in circuit protection devices, i.e. PTC compositions which comprise a crystalline polymer, e.g. polyethylene or polyvinylidene fluoride, and a conductive particulate filler, preferably carbon black, in amount sufficient to reduce the room temperature resistivity to a low level, e.g. less than 5 ohm-cm. Many conductive polymer compositions exhibit positive temperature coefficient of resistance (PTC) behavior, i.e. the resistance increases anomalously from a low resistance, low temperature state to a high resistance, high temperature state at a particular temperature.

Suitable conductive polymer compositions are disclosed in U.S. Pat. Nos. 4,237,441 (van Konynenburg et al), 4,388,607 (Toy et al), 4,534,889 (van Konynenburg et al), 4,545,926 (Fouts et al), 4,560,498 (Horsma et al), 4,591,700 (Sopory), 4,724,417 (Au et al), 4,774,024 (Deep et al), 4,935,156 (van Konynenburg et al), 5,049,850 (Evans et al), and 5,250,228 (Baigrie et al), 5,378,407 (Chandler et al), and 5,451,919 (Chu et al), in copending, commonly assigned U.S. application Ser. No. 08/255,497 (Chu et al, filed Jun. 8, 1995), now U.S. Pat. No. 5,582,770 Ser. No. 08/408,768 (Toth et al, filed Mar. 22, 1995), abandoned in favor of continuation application Ser. No. 08/798,887, filed Feb. 10, 1997, now U.S. Pat. No. 6,130,697, Ser. No. 08/408,769 (Wartenberg et al, filed Mar. 22, 1995), abandoned in favor of continuation application Ser. No 08/789,962, filed Jan. 30, 1997, now U.S. Pat. No. 5,747,147, and No. 60/002,725 (Chandler et al, filed Aug. 24, 1995) the provisional application for application Ser. No. 08/701,285, field Aug. 22, 1996, abandoned in favor of continuation application Ser. No. 08/910,865, filed Aug. 13, 1997, now U.S. Pat. No. 5,801,612. The disclosure of each of those patents and applications is incorporated herein by reference.

The conductive polymer can be fed to the conveying means in any appropriate way, including (a) in the form of a solid, e.g. pellets, prepared by a previous melt mixing process in which the conductive filler is dispersed in the polymer component; or (b) in the form of a dry blend of the polymeric component and the conductive filler, in which case the conveying means must be one which will melt-mix these ingredients, as well as convey them to the first gear pump; or (c) in the form of a molten dispersion of the conductive filler in the polymer component, prepared for example in an internal batch mixer.

For example, the present invention can be used to modify a process of the type disclosed in copending commonly assigned application Ser. No. 08/691,751 filed Aug. 1, 1996, by Chu et al. abandoned in favor of continuation application Ser. No. 09/156,805, filed Sep. 17, 1998 now abandoned, the disclosure of which is incorporated herein by reference. That process comprises making a conductive polymer laminate by (A) loading a dry blend of the polymeric component and the conductive filler into a mixing apparatus;

(B) mixing the polymeric component and the conductive filler in the mixing apparatus to form a molten mixture;

(C) transporting the molten mixture from the mixing apparatus through a die;

(D) forming the molten mixture into a polymeric sheet; and (E) attaching metal foil to at least one side of the sheet to form a laminate, steps (A) to (E) being conducted sequentially in a single continuous procedure.

In the present invention, the molten conductive polymer must pass through the apparatus as a continuous stream, but the duration of the process can be short or long. For example, when the conductive polymer is first prepared in an internal batch mixer and is then added as a molten mixture to the conveying means, the process may last for only a few minutes while the batch is processed.

Referring now to the drawing, this illustrates a single screw extruder 1, a passageway 2, a first gear pump 3, an extrusion head 4 having a nozzle orifice 41, and a second gear pump 5 having an exit 51. Pressure control system 8 monitors the pressure at junction of passageway 2 and first gear pump 3, and controls the operation of the second gear pump 5 in response to that pressure. Pellets of conductive polymer are fed from hopper 7 into extruder 1, which melts the conductive polymer and conveys it as a continuous stream under pressure through passageway 2 to the first gear pump 3. The first gear pump forces the molten conductive polymer through the extrusion orifice 41. The extrudate is calendered into a sheet by rollers 6. If the pressure observed by control system 8 exceeds a first preselected level, the control system switches on the second gear pump 5 so that molten conductive polymer is removed from the passageway 2 and discharged through exit 51. When the pressure observed by the control system 8 has dropped to a second selected level, it switches off the second gear pump 5.

What is claimed is:

1. A method of making an article composed of a conductive polymer, the method comprising the steps of (A) conveying a continuous stream of a molten conductive polymer under pressure to a first gear pump, said conductive polymer (1) comprising a particulate conductive filler dispersed in a polymer component, and (2) prior to becoming molten, being in the form of (a) a solid prepared by a previous melt-mixing process or (b) a dry-blend of the filler and the polymer component;

(B) operating the first gear pump so that the molten conductive polymer conveyed to the first gear pump in step (A) passes through the first gear pump to an extrusion orifice and is extruded through the orifice; and (C) when the pressure within the first gear pump exceeds a selected level, removing molten conductive polymer from the continuous stream thereof by means of a second gear pump, so that a constant volume of the molten conductive polymer is delivered to the extrusion orifice.

2. A method according to claim 1 wherein the conductive polymer (i) comprises a polymer having a melting point $T_m$° C.;

(ii) has a viscosity of 2 to 15 K.Pa.sec at a shear rate of 50 sec$^{-1}$ and at a temperature of 1.5 times $T_m$; and (iii) is extruded at a temperature of not more than 1.5 times $T_m$.

3. A method according to claim 2 wherein the molten conductive polymer has a viscosity of 8 to 11 K.Pa.sec. at a shear rate of 50 sec$^{-1}$ and at a temperature of 1.5 times $T_m$.

4. A method according to claim 1 wherein the conductive polymer contains at least 35% by volume of at least one particulate filler.

5. A method according to claim 1 wherein the conductive polymer exhibits PTC behavior and contains at least 40% by volume of carbon black.

6. A method according to claim 1 wherein the extrusion orifice is a nozzle die, and the extrudate is calendered into a sheet.

7. A method according to claim 1 wherein the extrusion orifice is a sheet die having a gap of at most 0.005 in.

* * * * *